United States Patent [19]

Diau

[11] Patent Number: 5,272,578
[45] Date of Patent: Dec. 21, 1993

[54] METHOD FOR WRITING A UNIFORM SERVO CODE INTO A MAGNETIC DISK DRIVE

[75] Inventor: Golden Diau, Hsinchu, Taiwan

[73] Assignee: Industrial Technology Research Institute, Hsinchu, Taiwan

[21] Appl. No.: 1,241

[22] Filed: Jan. 6, 1993

Related U.S. Application Data

[63] Continuation of Ser. No. 527,352, May 23, 1990, abandoned.

[51] Int. Cl.$^5$ ..................... G11B 21/02; G11B 5/596
[52] U.S. Cl. .................................... 360/75; 360/77.02
[58] Field of Search ............... 360/75, 77.02, 77.05, 360/77.07, 77.08, 77.11, 78.04, 78.14

[56] References Cited

U.S. PATENT DOCUMENTS 4,414,589 11/1983 Oliver et al. ............... 360/77.07
4,445,144 4/1984 Giddings ..................... 360/77.02
4,531,167 7/1985 Berger ........................ 360/77.05

Primary Examiner—Donald T. Hajec
Assistant Examiner—Won Tae C. Kim
Attorney, Agent, or Firm—Cushman, Darby & Cushman

[57] ABSTRACT

A method for writing a final track positioning servo code into a servo code signal region of a set of disks of a magnetic disk drive. the method includes writing a first temporary servo code in an opened loop manner into a first position in the set of disks, writing an Nth temporary servo code in a closed loop manner into an Nth position in the set of disks, writing an (N+1)th temporary servo code in the closed loop manner into an (N+1)th position in the set of disks, repeating the previous steps until the final servo code which has an even spacing and is recorded regularly is obtained and then writing the final servo code into the servo code signal region.

1 Claim, 7 Drawing Sheets

S1          S2          S3

S4

S5

METHOD FOR WRITING A UNIFORM SERVO CODE INTO A MAGNETIC DISK DRIVE

This is a continuation of application Ser. No. 07/527,352, filed on May 23, 1990, which was abandoned upon the filing hereof.

BACKGROUND OF THE INVENTION

The present invention relates generally to a method for writing servo code into a magnetic disk drive and, more particularly, to a method for writing servo code into a magnetic hard disk drive (HDD).

There is always a trend in the development of the magnetic disk drive to try to increase the storage capacity of a magnetic hard disk drive. One way to achieve the aim is to increase the track density of the disk drive. The track density of a modern, high performance HDD has been up to more than 1000 TPI (Tracks Per Inch) while the width of each track is less than one mil. To meet the requirement of the high track density in a magnetic disk drive which has a stepper motor to serve as a magnetic head actuator, a closed loop servo control technique must be used in association with the stepper motor to carry out a track positioning operation. In a closed loop servo control procedure, a servo code pre-stored in a predetermined region on a magnetic disk of the HDD is read out and serves as a reference source. The servo code read out provides information with regard to the quantity of off-track according to which a stepper motor controlling circuit carries out a micro-stepping regulation operation to determine the position of a track. Therefore, it is absolutely important that the servo code is recorded on a magnetic disk with an even track spacing. The tracks obtained on each disk surface according to an unevenly spaced servo code will be unevenly disposed. As a result, the validity of the data stored on disks and the performance of magnetic disk drives will be greatly affected.

In the production of a magnetic disk drive, two kinds of methods have been adopted to give a magnetic disk drive with a servo code which is accurately and evenly spaced. One method uses a dedicated servo code writing apparatus incorporating a laser positioning system to write a servo code into each magnetic disk drive on a one-by-one basis. Since expensive equipment is needed, the cost to produce a magnetic disk drive by using this method is very high. The other method involves accurately measuring the relationship between the operating current of the stepper motor in a disk drive and the micro-step spacing to figure out an operating current which is needed to obtain evenly spaced steps, and using the operating current figured out to drive the stepper motor in an opened loop manner so as to write the servo code into a magnetic disk of the disk drive. Although the production procedure by using the latter method identified above is simple, a great deal of time is needed in the development process to analyze the relationship between the step spacing and the operating current of a stepper motor. Furthermore, because of the differences which inevitably exist between the properties and the assembly tolerance of each stepper motor and each magnetic head carriage, only a fair result may be obtained by using the latter method. It is still impossible to achieve a smooth production with a high yield rate and a high quality.

SUMMARY OF THE INVENTION

Therefore, it is a primary object of the present invention to provide a self-adjusting type method for writing track positioning servo code, which is low-cost and timesaving and does not deal with the differences between the properties of respective stepper motors and the mechanisms of respective disk drives in mass production.

In accordance with the present invention, by utilizing the whole mechanism of a magnetic disk drive (including stepper motor, head carriage and so forth) and an electronic servo circuit, a closed loop control repetitive alternating writing rule is practiced to obtain a standard, track positioning servo code which allows tracks to be recorded with an even spacing. A stepper motor of a magnetic disk drive is driven, to carry out full-step and micro-step operations, simply by supplying a sine function current and a cosine function current which are supplied respectively to two winding coils of the stepper motor at different phases. Without the necessity to consider the unevenness of the spacing between two adjacent steps, a servo code is first written in an opened loop manner into one surface of a first disk of a set of disks in the disk drive. It is absolutely predictable that the servo code originally written into is distributed with terribly uneven spacings. The servo code originally written into and unevenly distributed is then read out. The servo code read out is written in a closed loop positioning servo control manner into a surface of a second disk of the set of disks and is distributed with a spacing more even than the servo code originally written into. The servo code second time written into is read out and is written in a closed loop positioning servo control manner into a surface of a third disk of the set of disks. By repeating in such a manner, a servo code which is spaced evenly and is suitable to serve as a reference source for track positioning will be obtained according to the principle of deflection convergence.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
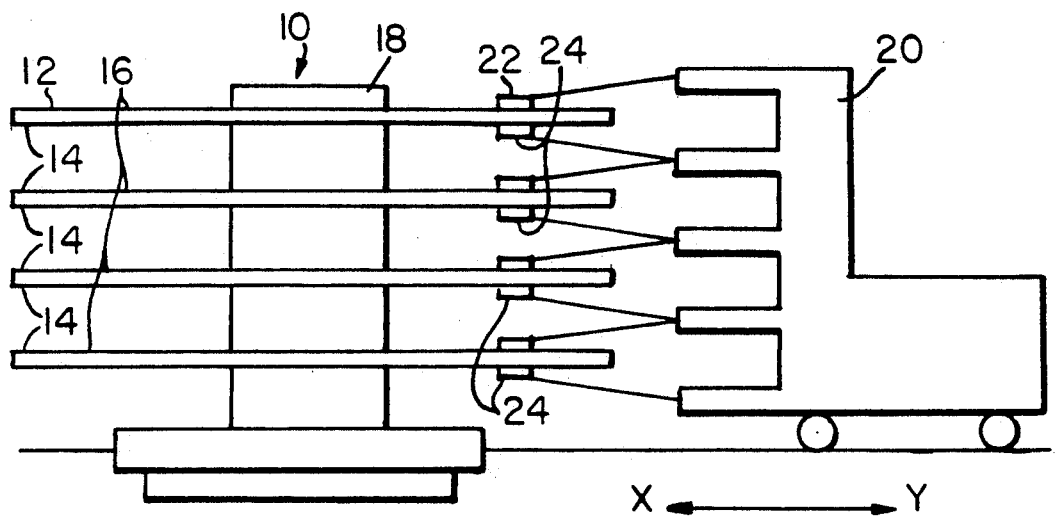
FIG. 1 is a front elevational plan view showing a dedicated servo system of a magnetic disk drive.

Two kinds of track positioning servo systems are frequently used, one being a dedicated servo system and the other being a burst servo system. These systems are two preferred embodiments of the present invention. Illustrated in FIG. 1 is a first preferred embodiment of the present invention utilizing a dedicated servo system. A magnetic hard disk drive 10 has a plurality of disks 16 supported by a rotatory shaft 18. A head carriage 20 has a magnetic servo head 22 and a plurality of magnetic data heads 24 carried by a leading end thereof. The head carriage 20 is driven by a stepper motor (not shown in the drawing) so that it is allowed to move the magnetic heads 22 and 24 along the disks 16 in the directions of arrows X and Y. As we may know, a dedicated servo system is a servo system in which a surface 12 of one of the disks 16 is devoted to the storage of a servo code which is necessary for a head track positioning servo control. The disk surface 12 for storing a servo code is named as a servo surface, while the other surfaces 14 of the disks 16 are devoted to the storage of digital information data and are named as data surfaces. The position of a track on a data surface 14 is determined according to the position of a servo code stored on the servo surface 12.

Figure 2:
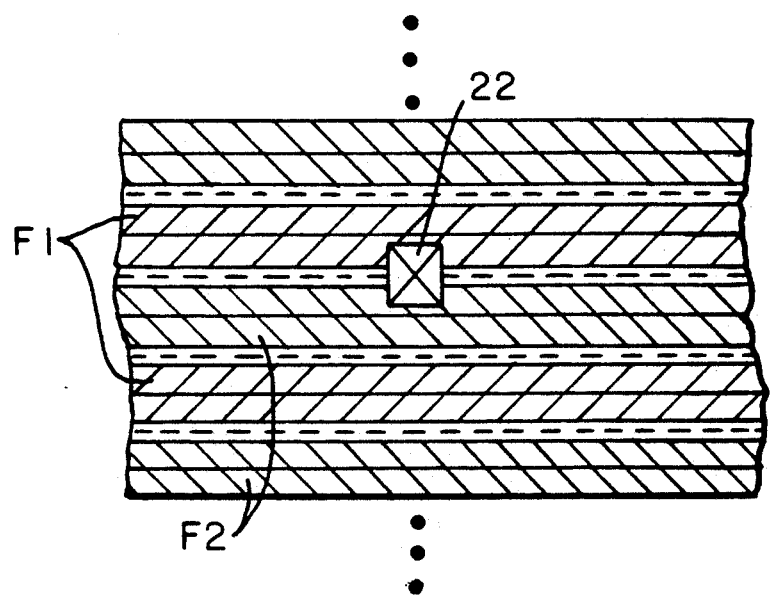
FIG. 2 is a schematic view showing a servo code on a system servo surface of a dual frequency dedicated servo system.

A dual frequency servo code usually used in a dedicated servo system is shown in FIG. 2 to exemplify the present embodiment of the present invention. The concentric circle type tracks on a disk have been expanded into a linear form in FIG. 2. It may be seen from FIG. 2 that two servo code signals F1, F2 at two different frequencies are alternately interlaced. The servo head 22 driven by the stepper motor reads out the servo code signals F1, F2 which are then used to carry out a closed loop servo control in a micro-stepping regulation operation. A position where the magnitudes of the signals F1, F2 are the same is deemed to be the center of a track on each of data surfaces 14 according to which the data heads 24 may determine the position of a track on each of data surfaces 14 when they are going to read or write digital information data. Therefore, it may be understood that the ability to execute an accurate track servo positioning operation and the validity of a track positioning data reading/writing operation are directly affected by whether or not the servo code signals F1, F2 are evenly spaced and regularly recorded. Accordingly, it is a major object of the method provided by the present invention to obtain servo code signals F1, F2 which have even spacings and are regularly recorded.

Figure 3:
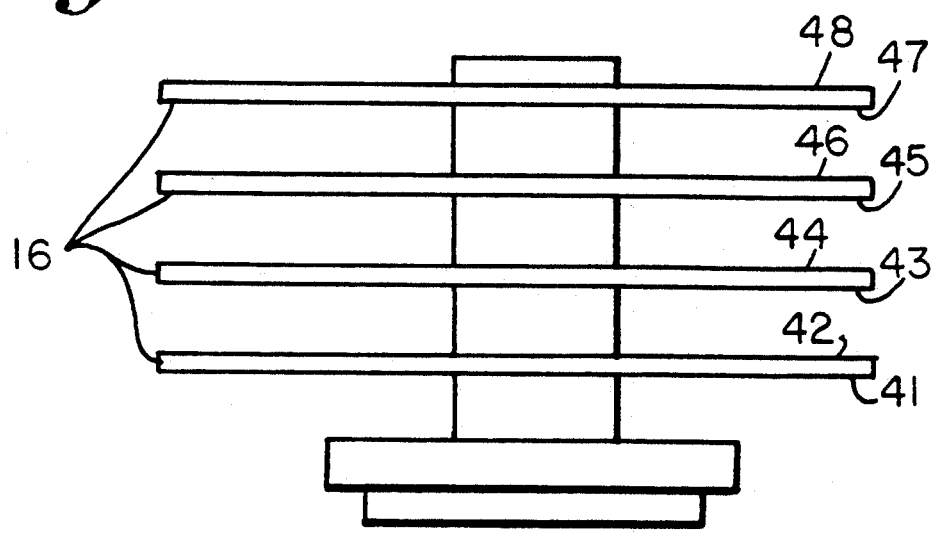
FIG. 3 is a schematic front elevational plan view showing the arrangement of disks in a magnetic disk drive.
Figure 4A:
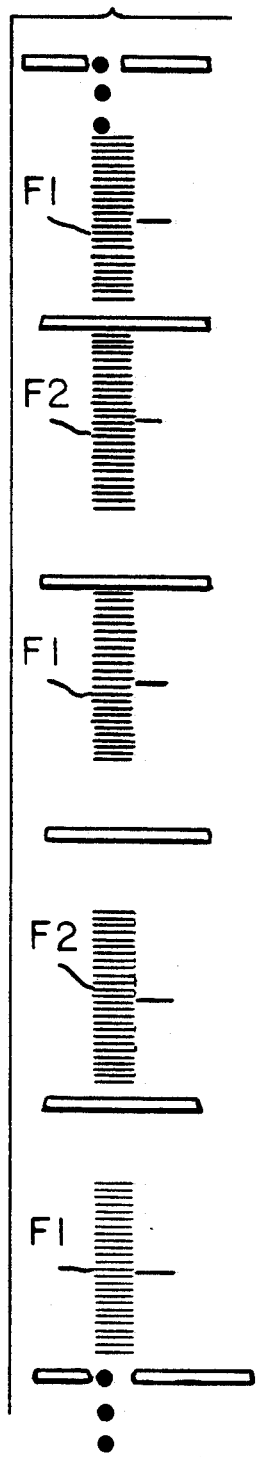
FIGS. 4A to 4E are schematic diagrams respectively showing the results obtained from each of five writing operations in which a dual frequency servo code is written five times by using a method according to a preferred embodiment of the present invention.
Figure 4B:
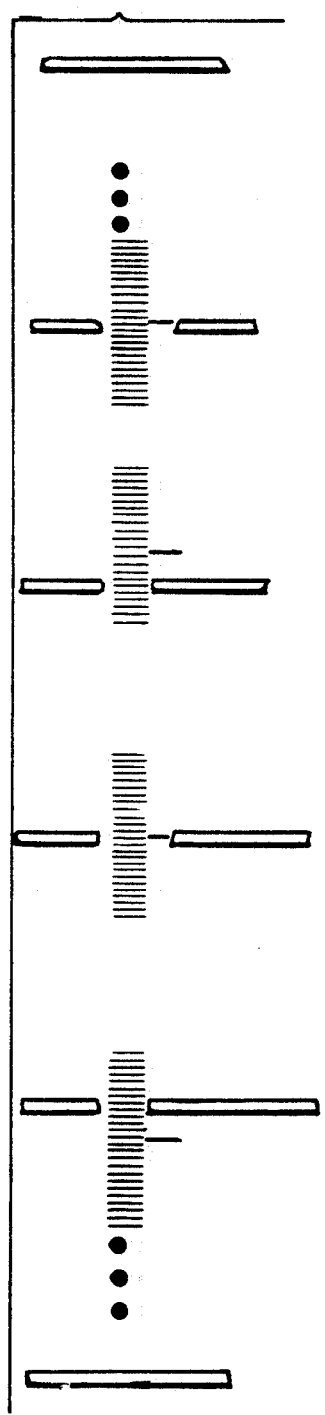
Figure 4C:
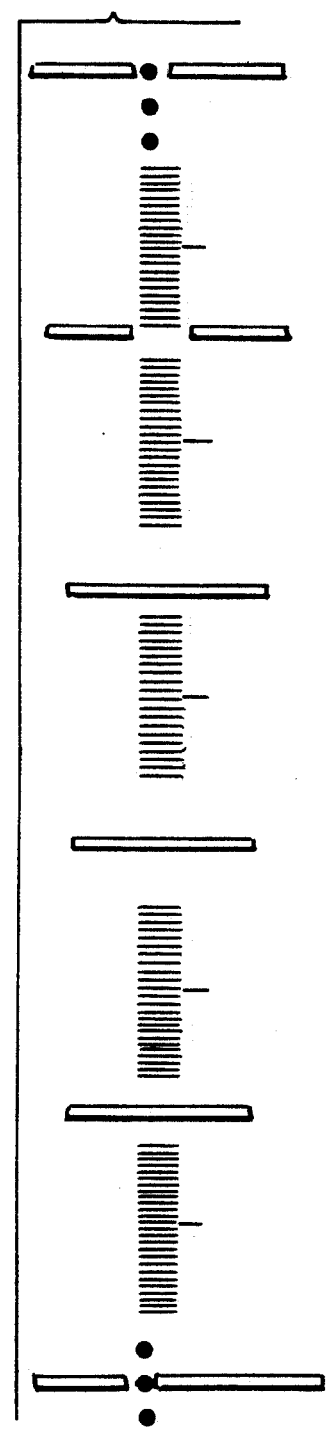
Figure 4D:
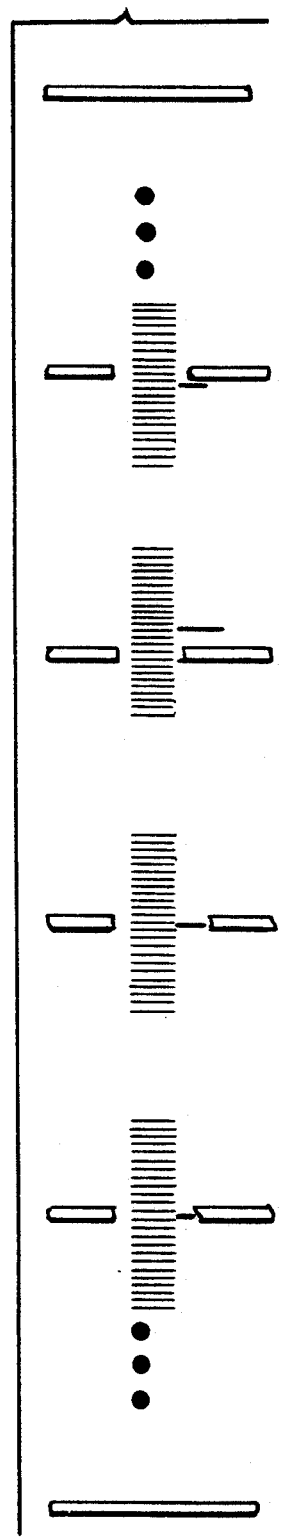
Figure 4E:
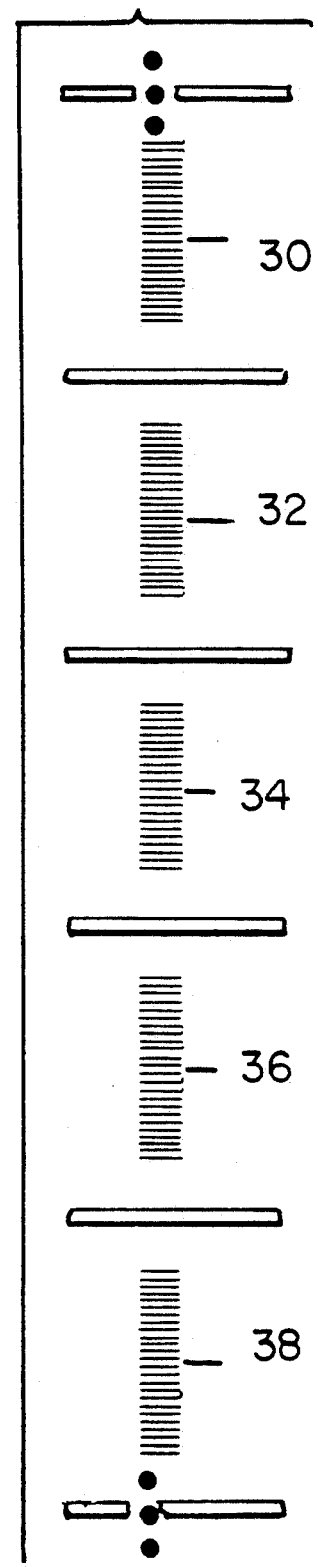

Referring to FIGS. 4A to 4E, five writing steps S1 to S5 of the method provided by the present invention are illustrated. In order to keep the drawings clear, only five magnetic tracks 30, 32, 34, 36 and 38 and five or four servo signals F1, F2 are shown. In a first step S1, the servo signals F1, F2 are written in an opened loop manner into a first surface 41 (see FIG. 3) of the set of disks 16. As shown in FIG. 4A, the result obtained from the first writing step S1 is the very unevenly recorded signals F1, F2. Then, the uneven S1 signals are retrieved to serve as a temporary reference servo code for a closed loop positioning servo control. That is, two adjacent signals F1, F2 (or F2, F1) at different frequencies are read out from the S1 signals each time. At a position corresponding to a relatively central position between the two adjacent signals F1 and F2 (or F2 and F1), a signal F1 (or F2) is written into a second surface 42 (see FIG. 3) of the set of disks 16 in a second step S2 (see FIG. 4B). The S2 signals again serve as a temporary reference servo code. By carrying out a second time closed loop positioning servo control, a signal F1 or F2 is written into a third surface 43 (FIG. 3) of the set of disks 16 in a third step S3 (FIG. 4C). By repeating the above-described writing process several times, a series of servo code signals F1, F2 evenly spaced and regularly recorded (for example the S5 signals as shown in FIG. 4E) will be obtained. Thus, a series of standard servo signals is formed.

Referring again to FIG. 3, after suitably repeating the above-described writing process several times, for example seven times from the first surface 41 to the seventh surface 47, the servo signals are written in a last writing process into a servo surface 48 to act as a series of standard servo signals.

As known in the art, the capability of a normal stepper motor to carry out a micro-step regulation has its limit. It is hardly possible to reach 1% of a full step. (If a full step of a stepper motor is 0.9 arc degree/full step, the ideal capability for one micro-step will have a precision up to 32.4 arc seconds when a full step is divided into 100 micro-steps.) Assuming that a stepper motor operates under the limit of capability, the error rate in which the spacings between adjacent signals F1 and F2 obtained from the original opened loop step S1 are unevenly distributed is within a range of plus or minus 15%, and the uneven distribution of the magnitudes of the spacings resulting from a normal combination of a magnetic disk drive mechanism and a stepper motor in most cases is in a form of distribution ". . . large, small, large, small, large, small . . . ", a result as listed in Table I will be obtained by carrying out the steps of the method of the present invention. It may be seen from Table I that in view of the self-adjustment, deflection convergence effect according to which the present invention is developed, the limit of plus or minus 1% may be reached after only four or five writing steps. As a further example, referring to Table II, even if the uneven distribution of the magnitude of spacing is in an arbitrary form while the error rate of the spacing is still within the range of plus and minus 15%, a satisfactory result may also be obtained after several repetitive writing steps. The decrease in the magnitude of the error rate of the spacing is self-evident.

TABLE I

| Original opened loop deflection error, % | Deflection error after closed loop control, % | | | | | | | | | |
|---|---|---|---|---|---|---|---|---|---|---|
| | S1 | S2 | S3 | S4 | S5 | S6 | S7 | S8 | S9 | S10 |
| . | . | . | . | . | . | . | . | . | . | . |
| . | . | . | . | . | . | . | . | . | . | . |
| . | . | . | . | . | . | . | . | . | . | . |
| 15 | 1 | 0 | 1 | 2 | 1 | 1 | 0 | 0 | 0 | 0 |
| −15 | 0 | 0 | 0 | 1 | 1 | 1 | 1 | 1 | 0 | 0 |
| 8 | −4 | −2 | −1 | 0 | 0 | 1 | 1 | 1 | 1 | 1 |

TABLE I-continued

| Original opened loop deflection error, % | Deflection error after closed loop control, % | | | | | | | | | |
|---|---|---|---|---|---|---|---|---|---|---|
| | S1 | S2 | S3 | S4 | S5 | S6 | S7 | S8 | S9 | S10 |
| −8 | 0 | −2 | −2 | −1 | −1 | 0 | 0 | 1 | 1 | 1 |
| 10 | 1 | 1 | −1 | −1 | −1 | −1 | −1 | 0 | 0 | 1 |
| −10 | 0 | 1 | 1 | 0 | −1 | −1 | −1 | −1 | −1 | 0 |
| 4 | −3 | −2 | −1 | 0 | 0 | 0 | −1 | −1 | −1 | −1 |
| −4 | 0 | −2 | −2 | −1 | −1 | 0 | 0 | 0 | −1 | −1 |
| 12 | 4 | 2 | 0 | −1 | −1 | −1 | 0 | 0 | 0 | −1 |
| −12 | 0 | 2 | 2 | 1 | 0 | 0 | 0 | 0 | 0 | 0 |
| 15 | 2 | 1 | 1 | 2 | 1 | 1 | 0 | 0 | 0 | 0 |
| −15 | 0 | 1 | 1 | 1 | 1 | 1 | 1 | 1 | 0 | 0 |
| 12 | −2 | −1 | 0 | 0 | 1 | 1 | 1 | 1 | 1 | 1 |
| −12 | 0 | −1 | −1 | 0 | 0 | 0 | 1 | 1 | 1 | 1 |
| 10 | −1 | −1 | −1 | −1 | −1 | 0 | 0 | 0 | 1 | 1 |
| −10 | 0 | −1 | −1 | −1 | −1 | −1 | 0 | 0 | 0 | 0 |
| 6 | −2 | −1 | −1 | −1 | −1 | −1 | −1 | −1 | 0 | 0 |
| −6 | 0 | −1 | −1 | −1 | −1 | −1 | −1 | −1 | −1 | 0 |
| 14 | 4 | 2 | 1 | 0 | −1 | −1 | −1 | −1 | −1 | −1 |
| −14 | 0 | 2 | 2 | 1 | 1 | 0 | 0 | −1 | −1 | −1 |
| 15 | 1 | 0 | 1 | 2 | 1 | 1 | 0 | 0 | 0 | 0 |
| −15 | 0 | 0 | 0 | 1 | 1 | 1 | 1 | 1 | 0 | 0 |
| 8 | −4 | −2 | −1 | 0 | 0 | 1 | 1 | 1 | 1 | 1 |
| −8 | 0 | −2 | −2 | −1 | −1 | 0 | 0 | 1 | 1 | 1 |
| 10 | 1 | 1 | −1 | −1 | −1 | −1 | −1 | 0 | 0 | 1 |
| −10 | 0 | 1 | 1 | 0 | −1 | −1 | −1 | −1 | −1 | 0 |
| 4 | −3 | −2 | −1 | 0 | 0 | 0 | −1 | −1 | −1 | −1 |
| −4 | 0 | −2 | −2 | −1 | −1 | 0 | 0 | 0 | −1 | −1 |
| 12 | 4 | 2 | 0 | −1 | −1 | −1 | 0 | 0 | 0 | −1 |
| −12 | 0 | 2 | 2 | 1 | 0 | 0 | 0 | 0 | 0 | 0 |
| . | . | . | . | . | . | . | . | . | . | . |

TABLE II

| Original opened loop deflection error, % | Deflection error after closed loop control, % | | | | | | | | | |
|---|---|---|---|---|---|---|---|---|---|---|
| | S1 | S2 | S3 | S4 | S5 | S6 | S7 | S8 | S9 | S10 |
| . | . | . | . | . | . | . | . | . | . | . |
| 6 | −1 | −3 | −3 | −3 | −2 | 0 | 1 | 1 | 1 | 1 |
| 8 | 7 | 3 | 0 | −2 | −2 | −2 | −1 | 0 | 0 | 1 |
| −10 | −1 | 3 | 3 | 2 | 0 | −1 | −1 | −1 | −1 | 0 |
| 5 | −3 | −2 | 1 | 2 | 2 | 1 | 0 | −1 | −1 | −1 |
| −10 | −3 | −3 | −2 | −1 | 1 | 1 | 1 | 0 | 0 | −1 |
| 12 | 1 | −1 | −2 | −2 | −1 | 0 | 0 | 1 | 1 | 0 |
| −4 | 4 | 3 | 1 | 0 | −1 | −1 | −1 | 0 | 0 | 0 |
| 8 | 2 | 3 | 3 | 2 | 1 | 0 | −1 | −1 | 0 | 0 |
| −12 | −2 | 0 | 2 | 2 | 2 | 1 | 1 | 0 | 0 | 0 |
| 6 | −3 | −3 | −1 | 0 | 1 | 2 | 1 | 1 | 0 | 0 |
| −10 | −2 | −3 | −3 | −2 | −1 | 0 | 1 | 1 | 1 | 1 |
| 12 | 1 | −1 | −2 | −2 | −2 | −1 | −1 | 0 | 1 | 1 |
| 0 | 6 | 4 | 2 | 0 | −1 | −1 | −1 | −1 | 0 | 0 |
| −10 | −5 | 1 | 2 | 2 | 1 | 0 | −1 | −1 | −1 | −1 |
| 4 | −3 | −4 | −2 | 0 | 1 | 1 | 0 | 0 | −1 | −1 |
| 6 | 5 | 1 | −2 | −2 | −1 | 0 | 1 | 0 | 0 | 0 |
| −2 | 2 | 4 | 2 | 0 | −1 | −1 | 0 | 0 | 0 | 0 |
| 8 | 3 | 3 | 3 | 3 | 2 | 0 | 0 | 0 | 0 | 0 |
| −10 | −1 | 1 | 2 | 2 | 3 | 2 | 1 | 1 | 0 | 0 |
| 12 | 1 | 0 | 1 | 1 | 2 | 2 | 2 | 2 | 1 | 1 |
| −15 | −2 | 0 | 0 | 0 | 1 | 1 | 2 | 2 | 2 | 1 |
| 10 | −3 | −2 | −1 | −1 | 0 | 0 | 1 | 1 | 2 | 2 |
| −10 | 0 | −1 | −2 | −1 | −1 | −1 | 0 | 0 | 1 | 1 |
| 6 | −2 | −1 | −1 | −1 | −1 | −1 | −1 | −1 | 0 | 0 |
| −2 | 2 | 0 | −1 | −1 | −1 | −1 | −1 | −1 | −1 | 0 |
| 4 | 1 | 2 | 1 | 0 | 0 | 0 | 0 | −1 | −1 | −1 |
| −4 | 0 | 1 | 1 | 1 | 1 | 0 | 0 | −1 | −1 | −1 |
| 12 | 4 | 2 | 1 | 1 | 1 | 1 | 0 | 0 | 0 | −1 |
| −12 | 0 | 2 | 2 | 2 | 1 | 1 | 1 | 1 | 0 | 0 |
| . | . | . | . | . | . | . | . | . | . | . |

In the following description, an alternative embodiment of the present invention will be described with reference to a burst servo system. In a burst servo system, the surfaces of all disks of a magnetic disk drive are data surfaces while a servo code is stored in a predetermined region of each track of each data surface. As shown in FIG. 5B, a servo code 50 for a so-called "index burst servo system" is stored in a short segment at a beginning point of each track. As shown in FIG. 5C, a servo code 52 for a so-called "sector burst servo system" is stored in a beginning segment of each sector 54 of each track. In view of the fact that the signals used in the above-mentioned two kinds of servo systems are the same, the description included hereinafter will be made by merely referring to an index burst servo system.

Figure 5A:
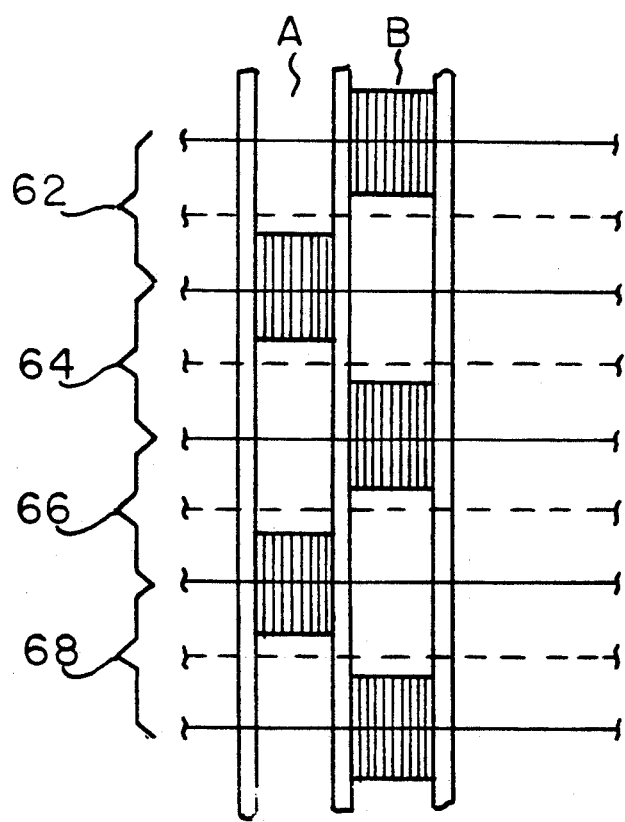
FIG. 5A is a schematic diagram showing the relationship between burst servo codes A and B and magnetic tracks.
Figure 5B:
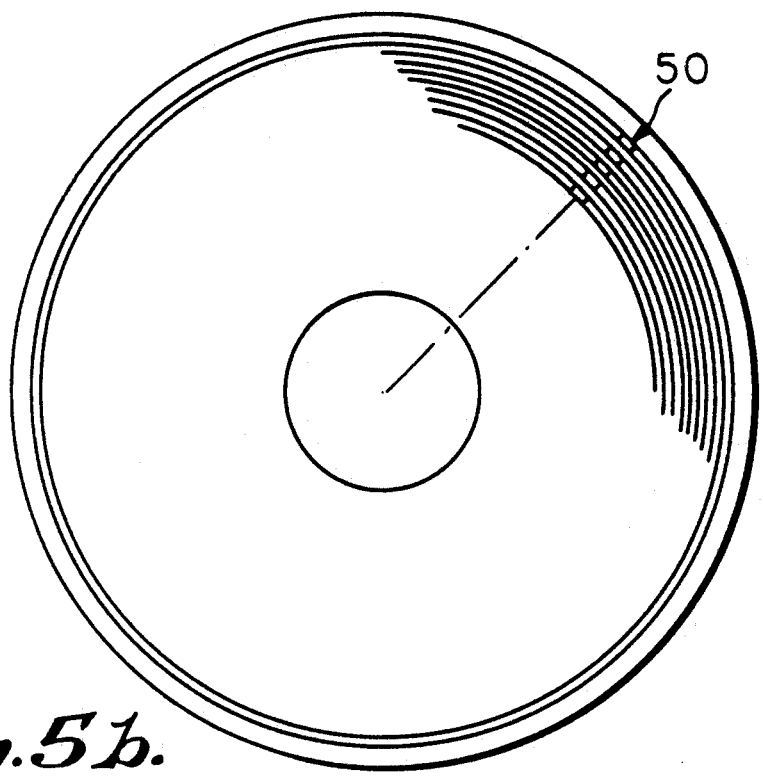
FIG. 5B is a schematic diagram showing the position of a servo code in an index burst servo system.
Figure 5C:
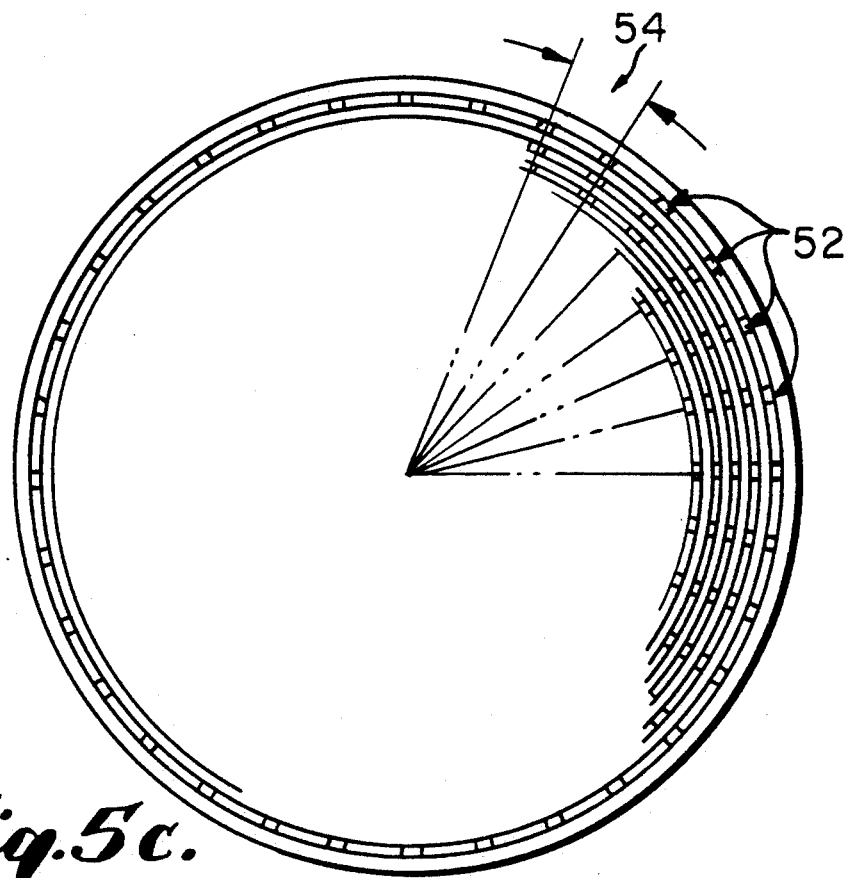
FIG. 5C is a schematic diagram showing the position of a servo code in a sector burst servo system.
Figure 6A:
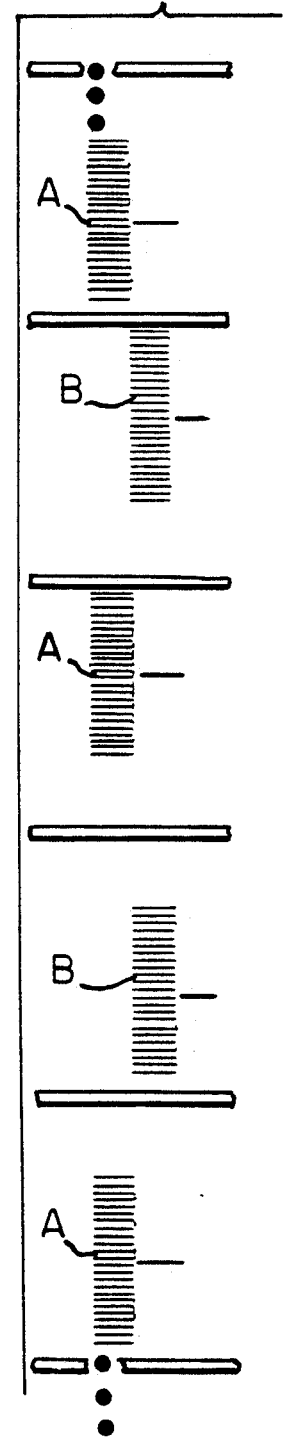
FIGS. 6A to 6E are schematic diagrams respectively showing the results obtained from each of five writing operations in which a burst servo code is written five times by using a method according to an alternative embodiment of the present invention.
Figure 6B:
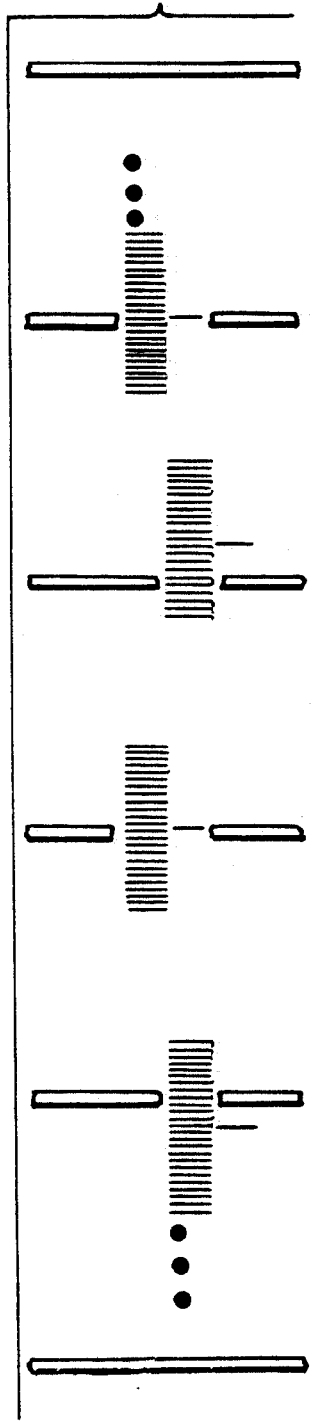
Figure 6C:
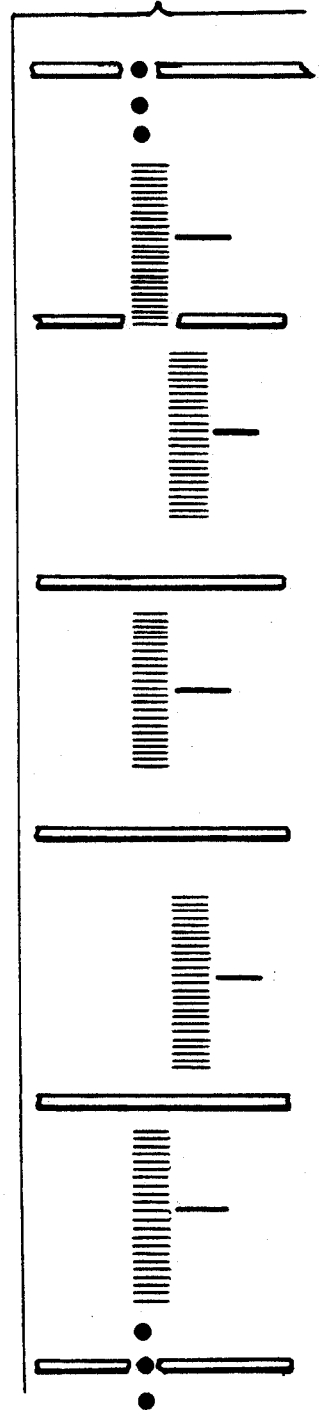
Figure 6D:
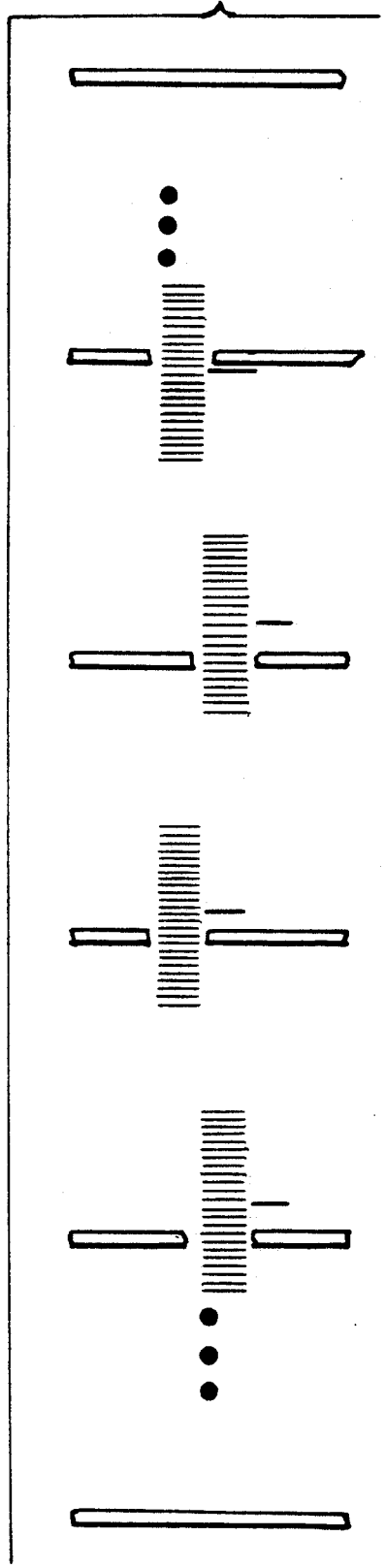
Figure 6E:
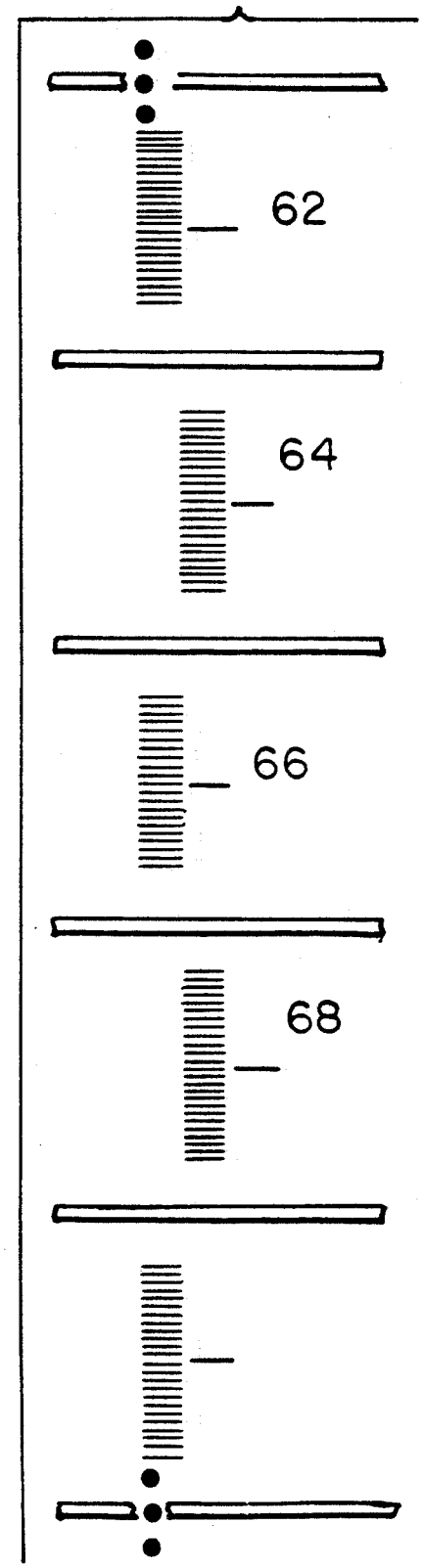

Referring now to FIG. 5A, two servo signals A and B are recorded in an alternately staggered manner in a segment at a beginning point of each track (such as each of tracks 62 to 68 as shown in FIG. 5A) respectively. The magnetic head will be positioned at the center of each track which is determined at a position corresponding to a position where the magnitudes of the signals A and B are the same. When the method of the present invention is applied to the index burst servo system, two manners may be adopted.

One manner involves carrying out steps similar to those used in a dedicated servo system identified above. It is assumed that a magnetic disk drive has four disks and, therefore, eight disk surfaces. A servo code is written into a first surface in an opened loop manner in a first step. According to the servo code written in the first step, a second surface is written in a closed loop manner in a second step. Then, a third surface is written in a closed loop manner in a third step according to the servo code written in the second step. The writing process is repeated in such a manner until a satisfactory result is obtained. The temporary servo code obtained in a last writing step is respectively written into each track of each disk surface to act as a final standard servo code which has an even spacing and is regularly recorded. The results shown in FIGS. 6A to 6E present the disposition of the respective servo signals A and B written in each of five writing steps, with the evenly spaced, final servo signals being shown in FIG. 6E.

In the other manner, the region of a track other than the final servo code storing segment thereof is used to act as a writing region for temporarily storing the temporary servo codes which will be written in each of writing steps. According to the method of the present invention, a temporary servo code is written into the temporary writing region in an opened loop manner in a first writing step. In the writing steps thereafter, the temporary servo code is written suitable times in a closed loop manner until the evenly spaced servo signals are obtained. The writing process is completed by writing the finally obtained, temporary servo code into the predetermined servo code storing region of each track of each disk surface.

According to the description above, the present invention may be practiced by carrying out each step of the servo code writing method to write the predetermined servo code. The position of each track is determined by repetitively executing a closed loop control operation. The method of the present invention may be programmed into software which may be executed in the hardware of a magnetic disk drive, including the mechanical mechanisms (including, for example, the stepper motor, the magnetic head and so on) and the electronic circuits (having the functions of, for example, carrying out a closed loop servo control operation, reading/writing information data and so forth) of the magnetic disk drive itself. The software programmed may be a process control program which is stored in a microprocessor in the electronic circuits.

Except for the original mechanisms of a magnetic disk drive itself, the method of the present invention needs no a special track positioning system which is usually expensive. The method of the present invention is independent of the differences between the mechanisms of separate disk drives in view of its characteristic of automatic error (deflection) convergence so that the track positioning servo code may be accurately written.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method of writing equally spaced servo codes onto at least one recording surface of a disc in a magnetic disc drive system including a plurality of discs, each disc having two recording surfaces, each of said recording surfaces having at least one magnetic head for writing data and servo codes thereon, said method comprising the steps of:

writing a first set of servo codes onto a first recording surface of a disc in said magnetic disc drive system, said set including a plurality of servo codes, a first servo code in said set being written at a predetermined position on said first recording surface and subsequent servo codes in said set each being written at a position on said first recording surface having a predetermined displacement relative to a position of a previously written servo code in said set;

writing an additional set of servo codes onto an additional recording surface of a disc in said magnetic disc drive system, each servo code in said additional set being written in a position corresponding to a center of two adjacent servo codes in a reference servo code set, said reference servo code set being written onto a recording surface immediately preceding the writing of said additional set of servo codes onto said additional recording surface;

selecting said additional set of servo codes to be a uniform servo code set when each space between adjacent servo codes of said additional servo code set are all within a predetermined value;

repeating said writing said additional set step and said selecting step until a uniform servo code set has been selected, said additional recording surface not being a recording surface upon which an immediately preceding set of servo codes have been written; and using said uniform servo code set as track positions on said plurality of discs.

* * * * *